United States Patent
McCall et al.

(10) Patent No.: US 10,865,763 B2
(45) Date of Patent: Dec. 15, 2020

(54) POWER TAKE-OFF FOR A WAVE ENERGY CONVERTER

(71) Applicant: Dehlsen Associates, LLC, Santa Barbara, CA (US)

(72) Inventors: Alan L. McCall, Santa Barbara, CA (US); Patrick J. McCleer, Holland, MI (US)

(73) Assignee: DEHLSEN ASSOCIATES, LLC, Santa Barbara, CA (US)

( * ) Notice: Subject to any disclaimer, the term of this patent is extended or adjusted under 35 U.S.C. 154(b) by 0 days.

(21) Appl. No.: 16/253,118

(22) Filed: Jan. 21, 2019

(65) Prior Publication Data

US 2019/0226444 A1    Jul. 25, 2019

Related U.S. Application Data

(60) Provisional application No. 62/621,377, filed on Jan. 24, 2018.

(51) Int. Cl.
    *F03B 13/18*     (2006.01)
    *F03B 15/00*     (2006.01)
    (Continued)

(52) U.S. Cl.
    CPC .......... *F03B 13/1855* (2013.01); *F03B 13/20* (2013.01); *F03B 15/00* (2013.01);
    (Continued)

(58) Field of Classification Search
    CPC ........ F05B 2220/7068; F05B 2220/707; F05B 2260/821; F05B 2270/20; F03B 13/20; F03B 15/00; F03B 13/1855; H02K 7/1869
(Continued)

(56) References Cited

U.S. PATENT DOCUMENTS 6,020,653 A * 2/2000 Woodbridge ....... F03B 13/1865
    290/42
6,812,588 B1 * 11/2004 Zadig .................... F03B 13/187
    290/53

(Continued)

FOREIGN PATENT DOCUMENTS

| CN | 102437702 A | 5/2012 | |
|---|---|---|---|
| CN | 202503419 U | 10/2012 | |
| WO | WO-2015176057 A1 * | 11/2015 | .............. F03B 17/06 |

OTHER PUBLICATIONS

Starrett, Mike; Ratanak, So; Brekken, Ted K.A.; McCall, Alan; "Increasing Power Capture From Multibody Wave Energy Conversion Systems Using Model Predictive Control"; 2015 IEEE Conference on Technologies for Sustainability (SusTech); Jul. 30, 2015.

*Primary Examiner* — Charles Reid, Jr.
(74) *Attorney, Agent, or Firm* — Felix L. Fischer

(57) ABSTRACT

A wave energy converter incorporates a floating body and a reaction body engaging the floating body wherein the reaction body is static or oscillating out of phase relative to the floating body. A power take-off (PTO) has at least one direct drive linear generator, a high level controller responsive to sensors engaged to the direct drive linear generator and providing a PTO force change command ($dF_{PTO}$) and a low level controller receiving the PTO force change command and providing control signals to power electronics connected to the direct drive linear generator. The direct drive linear generator is operable responsive to the control signals to achieve optimal power extraction performance with high force at low speed with operation in two physical directions and operating as both a motor and a generator for a total of four quadrants of control.

14 Claims, 8 Drawing Sheets

(51) Int. Cl.
*H02K 7/18* (2006.01)
*F03B 13/20* (2006.01)

(52) U.S. Cl.
CPC ...... *H02K 7/1869* (2013.01); *F05B 2220/707* (2013.01); *F05B 2220/7068* (2013.01); *F05B 2260/821* (2013.01); *F05B 2270/20* (2013.01)

(58) Field of Classification Search
USPC ..................................................... 290/42, 53
See application file for complete search history.

(56) References Cited

U.S. PATENT DOCUMENTS

| | | | | |
|---|---|---|---|---|
| 7,362,003 | B2* | 4/2008 | Stewart | F03B 13/1845 290/42 |
| 7,405,489 | B2* | 7/2008 | Leijon | F03B 13/189 290/42 |
| 8,105,052 | B1* | 1/2012 | Hill, Jr. | F04B 17/00 417/331 |
| 8,482,145 | B2 | 7/2013 | Houser | |
| 8,723,355 | B2* | 5/2014 | Eder | F03B 13/16 307/9.1 |
| 8,912,677 | B2 | 12/2014 | Dehlsen | |
| 9,595,858 | B2 | 3/2017 | Lipo | |
| 2004/0251692 | A1* | 12/2004 | Leijon | F03B 13/1885 290/42 |
| 2006/0208839 | A1 | 9/2006 | Taylor et al. | |
| 2007/0075593 | A1* | 4/2007 | Petro | H02K 21/12 310/12.14 |
| 2007/0261404 | A1 | 11/2007 | Stewart et al. | |
| 2008/0295509 | A1* | 12/2008 | Bernitsas | F03B 17/06 60/497 |
| 2009/0066087 | A1* | 3/2009 | Van Huffel | F03B 17/06 290/54 |
| 2009/0146429 | A1* | 6/2009 | Protter | F03B 13/16 290/53 |
| 2010/0084869 | A1* | 4/2010 | Leijon | F03B 13/1865 290/53 |
| 2011/0193347 | A1* | 8/2011 | Leijon | H02K 7/1876 290/53 |
| 2011/0198850 | A1* | 8/2011 | Stromstedt | F03B 13/1815 290/53 |
| 2013/0062889 | A1* | 3/2013 | Thoresen | F03B 13/12 290/1 R |
| 2013/0067904 | A1* | 3/2013 | Leijon | F16F 1/40 60/506 |
| 2013/0127167 | A1* | 5/2013 | Dore | F03B 13/1885 290/53 |
| 2013/0140824 | A1* | 6/2013 | Leijon | B66D 1/36 290/53 |
| 2014/0265399 | A1 | 9/2014 | Dehlsen | |
| 2015/0013325 | A1 | 1/2015 | Dehlsen | |
| 2016/0252071 | A1* | 9/2016 | Phillips | F03B 13/20 290/50 |
| 2016/0297647 | A1 | 10/2016 | Tangudu et al. | |
| 2017/0009732 | A1* | 1/2017 | Mundon | F03B 13/18 |
| 2017/0198401 | A1* | 7/2017 | Phillips | H02K 7/1853 |

* cited by examiner

POWER TAKE-OFF FOR A WAVE ENERGY CONVERTER

REFERENCES TO RELATED APPLICATIONS

This application claim priority of U.S. provisional application Ser. No. 62/621,377 filed on Jan. 24, 2018 entitled POWER TAKE-OFF FOR A WAVE ENERGY CONVERTER, the disclosure of which is incorporated herein by reference.

BACKGROUND

Field of the Invention

The present invention relates to the extraction of electrical power from a linear oscillatory mechanical input with multiple frequency components, more specifically for use as a power take-off of an ocean Wave Energy Converter (WEC).

Description of the Related Art

There is a vast resource of energy within the world's oceans. This energy is embodied in currents, thermal gradients, or as is of principal interest of this invention, wave motion. A device capable of economically extracting the energy of ocean waves would be capable of providing a significant portion of the world's energy needs if widely deployed. Experimental devices exist and are known as Wave Energy Converters (WECs).

A WEC Power Take-off (PTO) is the means of extracting mechanical energy from the ocean and converting it into electrical energy. Such a system includes both software (controls) and hardware (gearboxes, linkages, powertrains, generators, etc.). WECs have often been equipped with relatively simple controllers, providing a mechanical damping coefficient to maximize power from the dominant wave frequency only. On the hardware side, WEC PTOs often implement hydraulics as a method of transmitting and converting linear motion induced by wave energy extraction.

Wave Energy Converters face significant technical and economic challenges because Wave Energy, unlike other renewables, must be collected from an extremely dynamic resource. Ocean waves are not a simple, single frequency wave, but rather the superposition of countless frequency and amplitude waves. As a result, a Wave Energy Converter must be able to extract energy efficiently from a wide frequency spectrum and change operating conditions on a second, or sub-second time scale for maximum energy extraction.

SUMMARY

The present invention relates to a Wave Energy Converter (WEC) Power take-off (PTO) designed to utilize both software and hardware to extract greater amounts of electrical energy from ocean waves than can be achieved through existing means. The invention comprises a linear electric motor-generator combined with both low level and high level control systems. The high level control system dictates a desired operational state for the linear electric motor-generator which is achieved through the usage of a low level control system. The linear electric motor-generator is a machine designed for the purpose of achieving high energy conversion efficiencies in the operating states of the WEC and subsequent high level control system.

In one implementation of this invention, the linear electric motor-generator comprises a Vernier Effect Permanent Magnet Linear Generator while the high level control system utilizes a reactive control approach.

BRIEF DESCRIPTION OF THE DRAWINGS

The present may be better understood, and its numerous features and advantages made apparent to those skilled in the art by referencing the accompanying drawings. For ease of understanding and simplicity, common numbering of elements is employed where an element is the same in different drawings.

DETAILED DESCRIPTION

The following is a detailed description of illustrative implementations of the present invention. As these implementations of the present invention are described with reference to the aforementioned drawings, various modifications or adaptations of the methods and or specific structures described may become apparent to those skilled in the art. All modifications, adaptions, or variations that rely upon the teachings of the present invention, and through which these teachings have advanced the art, are considered to be within the spirit and scope of the present invention. For example, the device set forth herein has been characterized as a Wave Energy Converter Power Take-off, but it is apparent that other uses may be found for this device. Hence, these drawings and descriptions are not to be considered in a limiting sense as it is understood that the present invention is in no way limited to the implementations illustrated.

Figure 1:
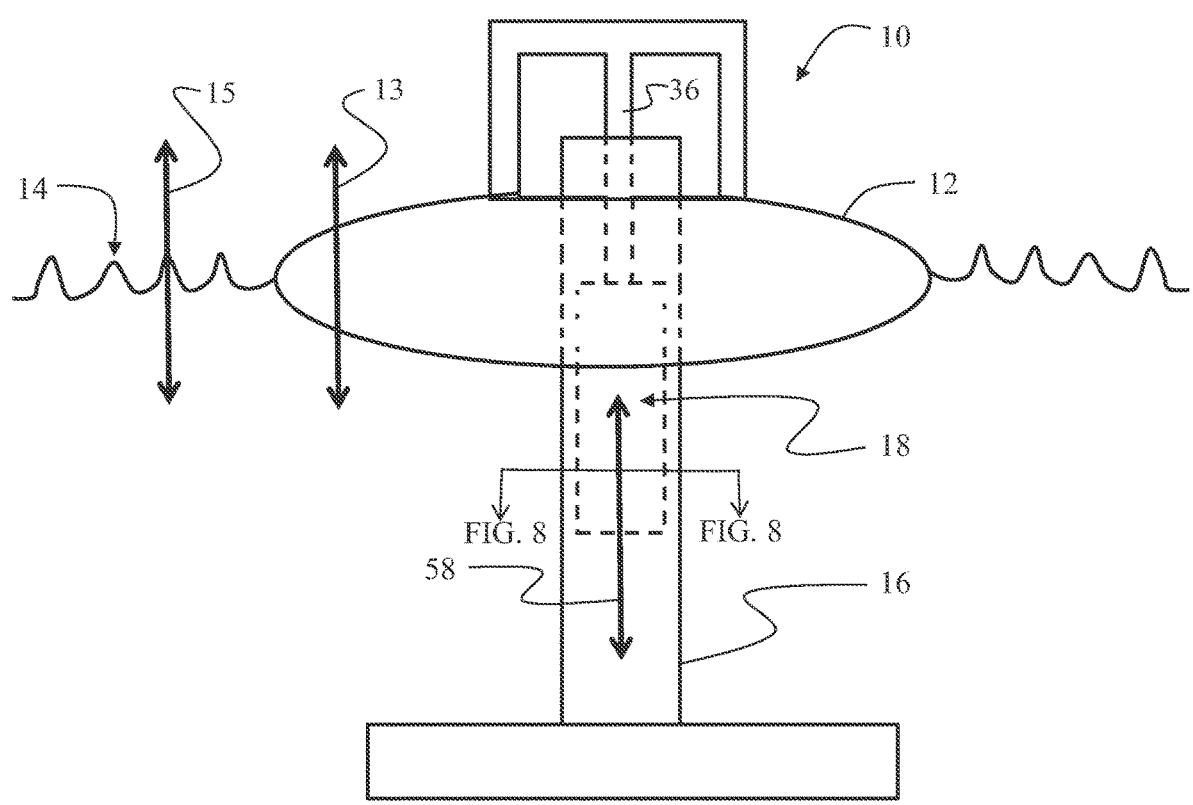
FIG. 1 is a side view of an example Wave Energy Converter incorporating an implementation of a PTO system.
Figure 2:
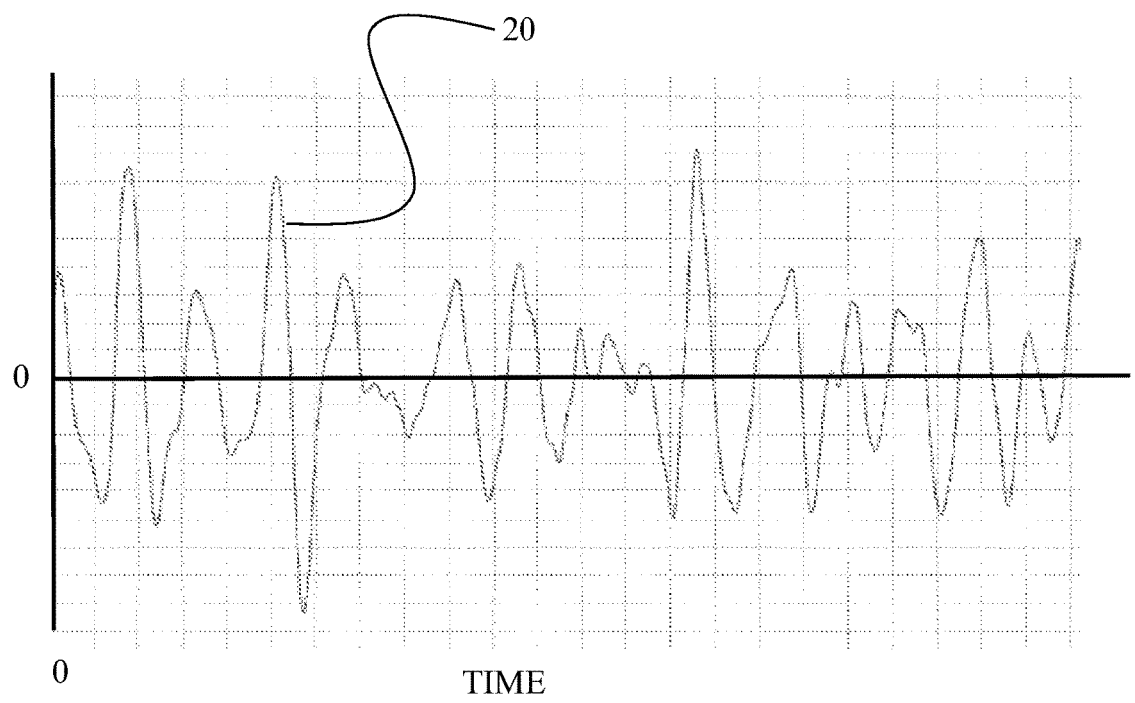
FIG. 2 is an example time series of a typical operating sea state.

The implementations presently disclosed provide a Power Take-off (PTO) system for use in an ocean Wave Energy Converter (WEC). For purposes of illustration, an example two body WEC is presented in FIG. 1. This is a point-absorber type WEC 10 with capability of extracting energy in a vertical, heave, direction. A wave activated floating body 12 oscillates in the heave direction (as represented by arrow 13) as force (depicted by arrow 15) is imparted upon it by the waves in the ocean water depicted as element 14. An exemplary time series 20 of the motion of the water waves 14 is depicted in the graph of FIG. 2. The floating body 12 is engaged by and reacts against a reaction body 16 which is either static or oscillating out of phase relative to the floating body. The forces between the two bodies are transmitted through a PTO device 18. Most WEC PTOs are either limited by a lack of optimal controls, a lack of capability in their generator and power train system, or both.

In the case of a lack of control, the high level control of the WEC does not have the sufficient formulation or information to predict and command the optimal operating state for the generator and power train system. For example, a controller that is designed to sense the dominant frequency component of a sea state and command a desired damping value for the generator does not have the capability to command the generator to optimally extract power from any frequency components other than the detected dominant frequency. Moreover, the controller may not have adequate sensor information to even be aware of the energy available in other wave frequency components. FIG. 2 is presented to provide a visual understanding of a time series of a typical operating sea state containing multiple frequency components.

In the case of a lack of capability of a generator and power train system, even if the controller had perfect information relating to the optimal operating state of the generator at present and in the short-term future, the generator and power train system may not be capable to act on such information. For example, if a controller wished to command a certain generator and power train system to quickly change operating state in order to capture available energy in an upcoming higher frequency component of a wave, the generator and power train system may have excessive inertia or insufficient operating force capability to change operating state in a timely manner.

Figure 3:
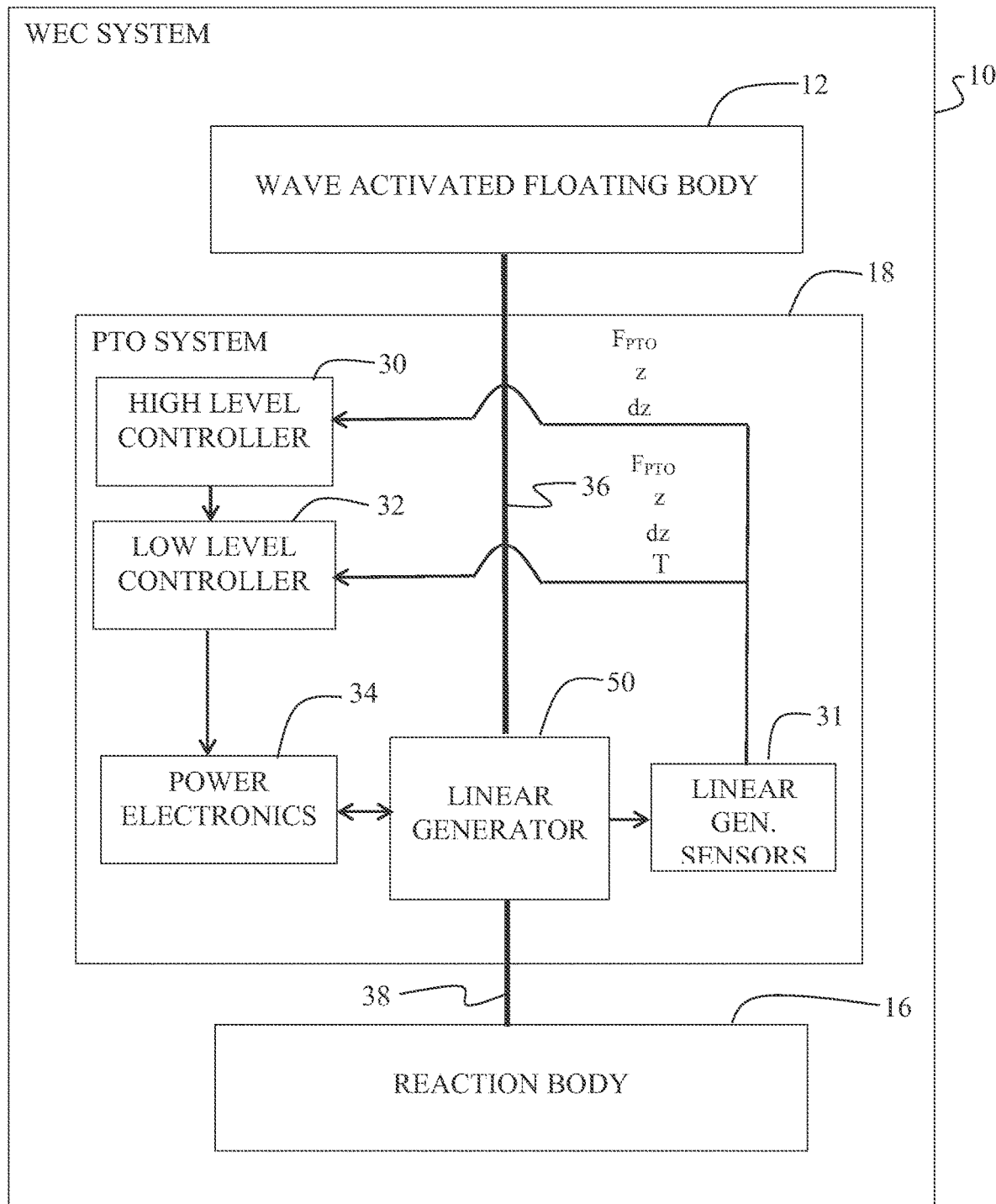
FIG. 3 is a block diagram of the PTO system integrated with an example WEC system.

The presently disclosed implementation solves these problems by utilizing an entire, integrated Power Take-off system containing a purpose built high level control, low level control, power train, and electrical generator all working together optimally. The full system is outlined as it would be utilized in the example WEC 10 from FIG. 1 in the block diagram of FIG. 3. In an exemplary implementation, a direct drive linear electric generator 50 (to be described in greater detail subsequently with respect to FIGS. 5 and 6) is utilized in the PTO 18, and therefore the power train and generator are consolidated into a single element with no need for a gearbox or transmission. As can be seen in FIG. 3, the implementation disclosed incorporates several components, each of which will be described with their interactions with the other subcomponents outlined.

Figure 4:
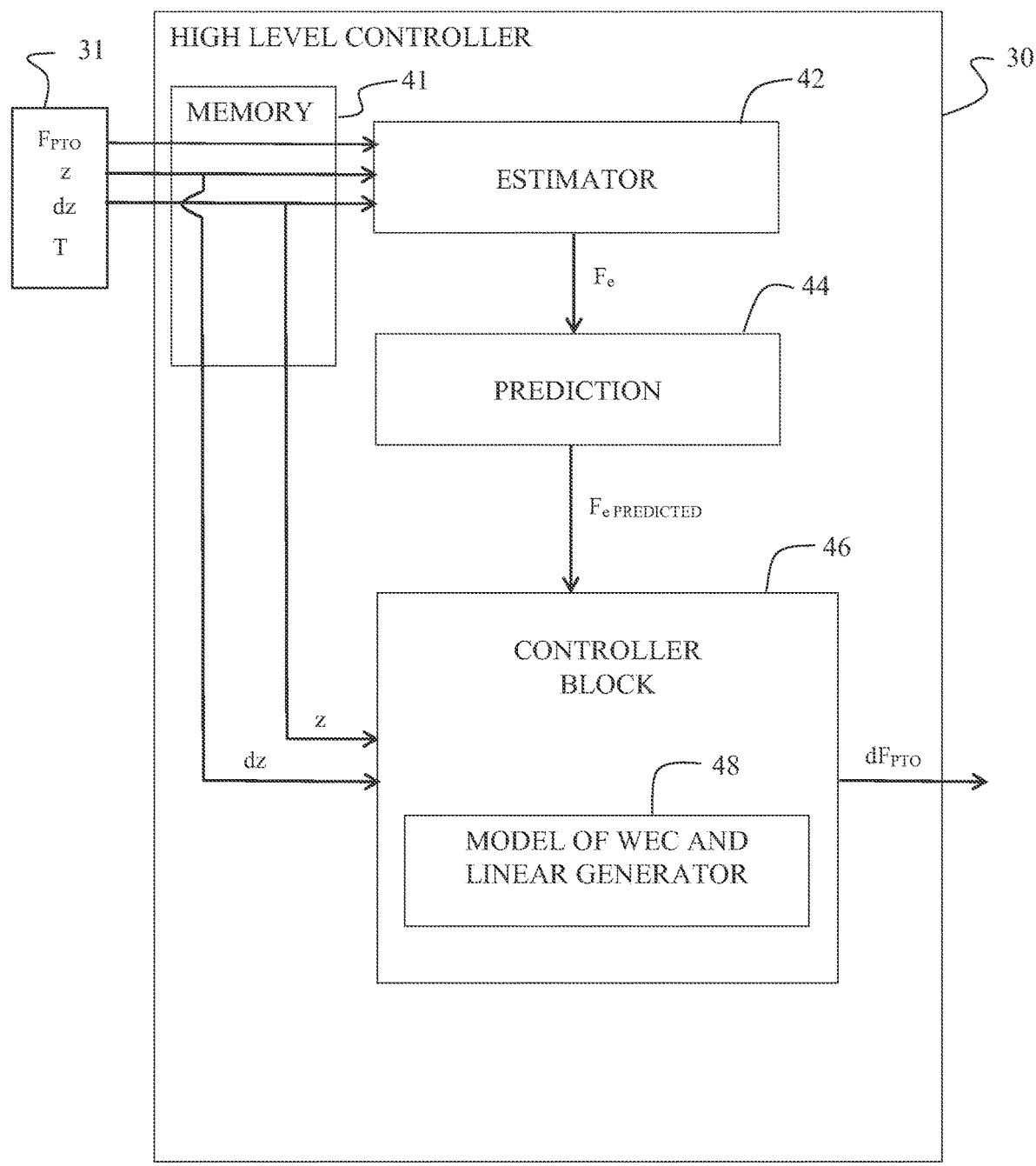
FIG. 4 is a block diagram of the high level controller.

A high level controller 30, such as a computer having either a general purpose processor or single purpose processor utilizing one or more cores with a readable memory 41, for processing calculation modules (which may be implemented in hardware or software subroutines). The high level controller 30 contains several modules as shown in FIG. 4. Specifically, the high level controller 30 contains an estimator block 42, a prediction block 44, and a control block 46. Further, the control block 46 includes a model 48 of the WEC 10 and the linear generator 50 including the mass and hydrodynamic properties of each body. One or more sensors 31 associated with the linear generator 50 transmit a signal to the high level controller 30 which includes the present force (Fpto) applied between the linear generator 50 and the wave activated floating body 12, the position (z) of a translator 54 relative to one or more stators 52 of the linear generator 50 and the rate of change of this position (dz). This data is collected and stored in the computer readable memory 41 which can be accessed by the high level controller 30, creating a data store of time indexed sensor values. While Fpto and z must be transmitted to the high level controller 30, dz may also be calculated based on the time series data of z.

The estimator block 42 uses Fpto, z, and dz along with knowledge of the Wave Energy Converter's physical properties to calculate the estimated excitation force (Fe) impacted upon the wave activated body by the sea.

The prediction block 44 uses the time series history of Fe output by the estimator block 42 as an input to an autoregressive model to calculate a prediction of future Fe over a specified time horizon.

Finally, the control block 46 uses the future prediction of Fe output from the prediction block 44 with the current states of z and dz as transmitted from the linear generator sensors 31, and the numerical model 48 of the WEC and linear electric generator to predict the WEC and linear generator's response to the future excitation force imparted by the wave action the ocean water. With the ability to model the future response of the WEC given the predicted Fe over a certain time horizon, the control block 46 then utilizes an optimization function to select a set of change of PTO force ($dFp_{To}$) commands over a specified time horizon to maximize electrical power extraction. The commanded $dF_{pTo}$ is then sent to the low level controller 32.

As represented in FIG. 3, the low level controller 32 receives the high level controller 30 and linear generator sensors 31 outputs, and then computes and commands appropriate action from the power electronics 34 which in turn drive the linear generator 50.

The linear generator 50 is capable of acting on the desired control commands in order to achieve optimal power extraction performance of the WEC system. The general nature of these control commands is highly variable in operational state from second to second and typically requiring high force at low speed with operation in two physical directions and operating as both a motor and a generator for a total of four quadrants of control. The linear generator 50 in the disclosed implementation is a direct drive permanent magnet linear generator which receives control commands and adapts to new operating states on a sub-second time scale. The linear generator 50 is designed as a module which can be combined in parallel or series as shown in the detailed view of FIG. 5 by mechanically linking a plurality of stators 52 in series such that lateral edges 53 of the stators are flush with one-another creating a single electric machine suitable for the maximum force requirement of the specific WEC. Similarly, a translator 54 having a plurality of modules 55 is mechanically connected at lateral edges 56 of the modules to form a single mechanical body matching the length of the stators plus excess length 59 in a direction of oscillatory travel 58 which is determined to meet the desired stroke length requirement of the WEC. For the exemplary implementation, the translator 54 is connected to the wave activated floating body 12 with an arm or rod 36 (seem in FIG. 1) while the stators 52 are linked to the reaction body 16.

Figure 5:
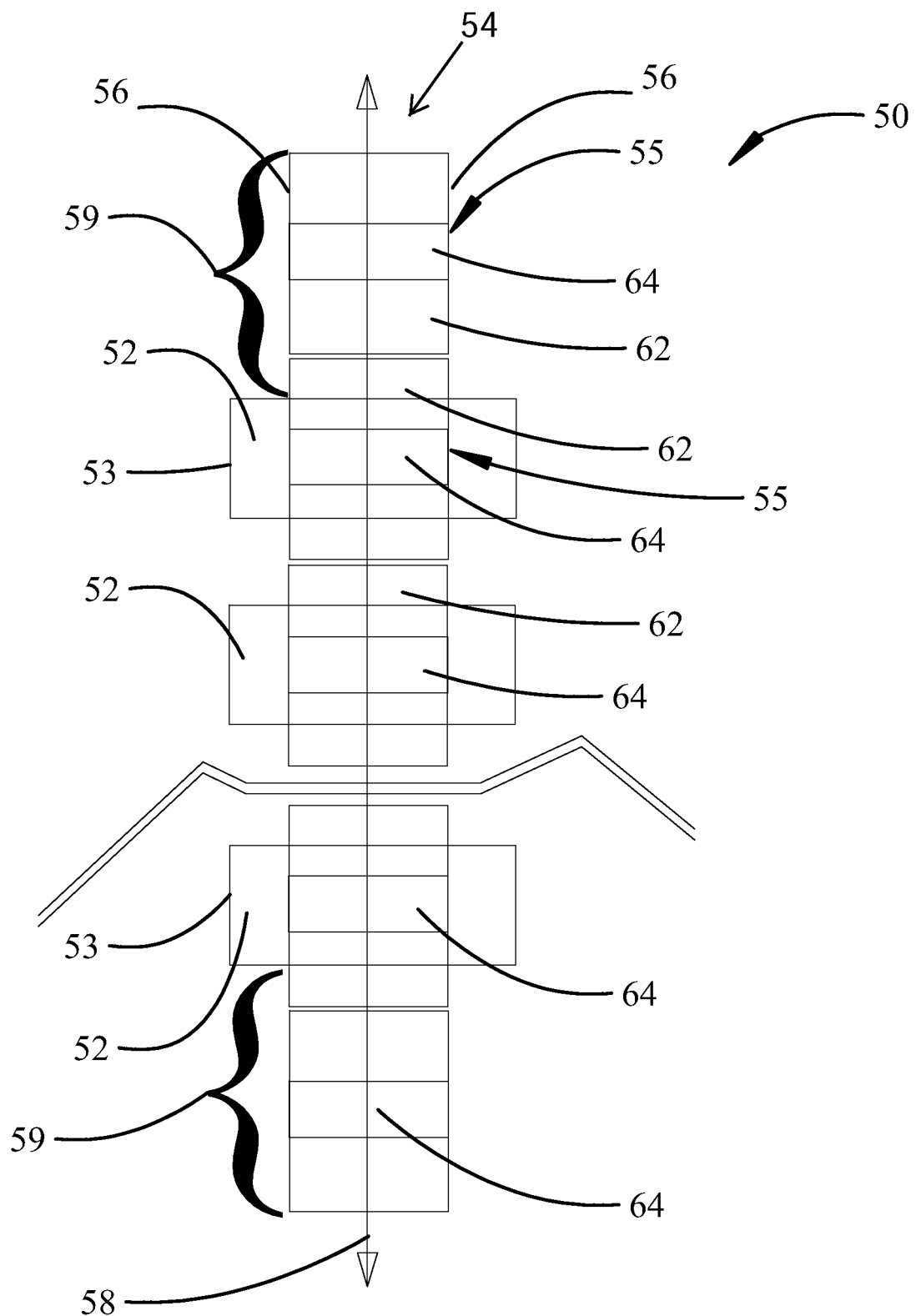
FIG. 5 is detailed view of the stator and translator modules forming a complete linear electric motor generator.
Figure 6:
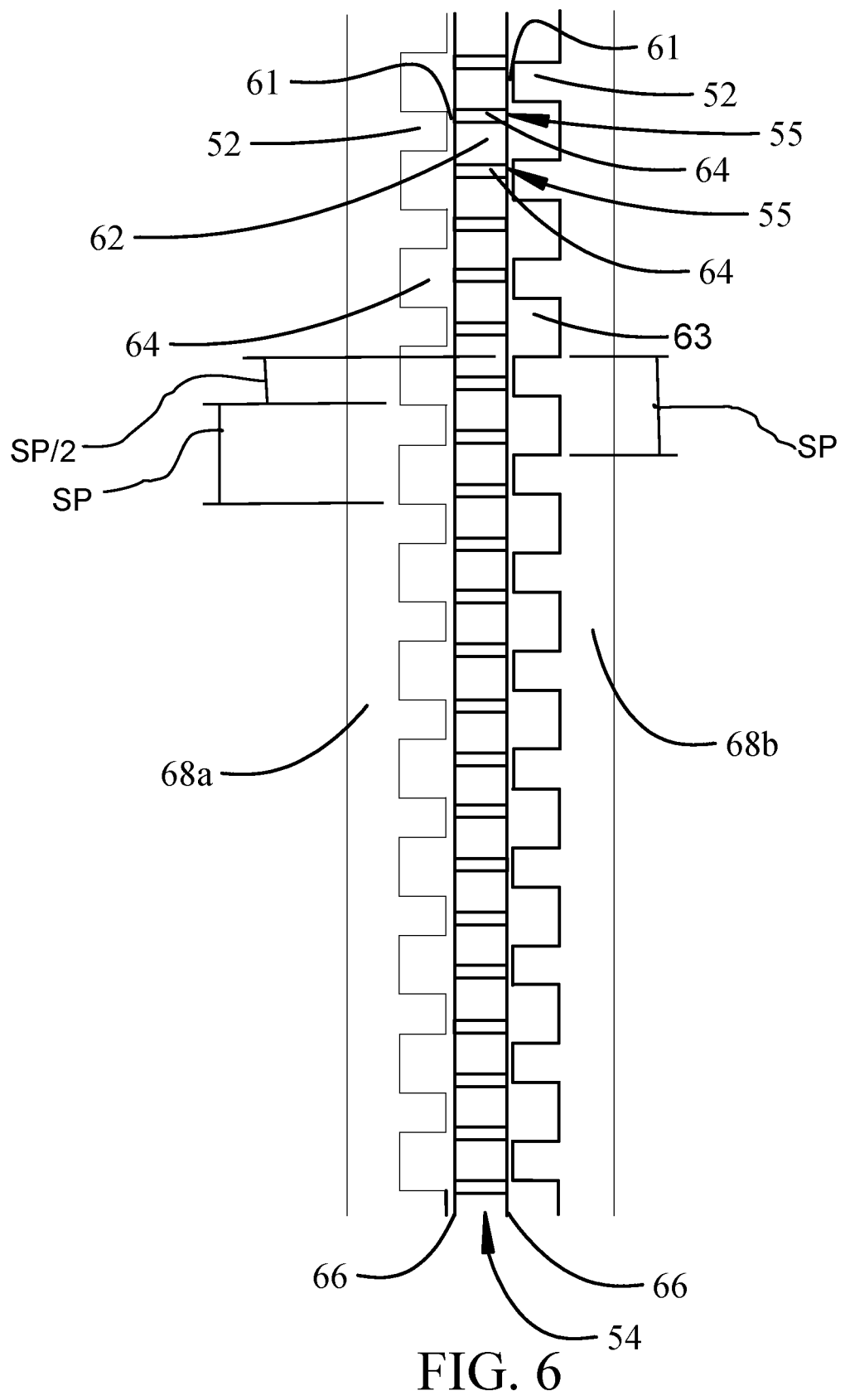
FIG. 6 is an overall depiction of the Vernier permanent magnet linear generator structure.

In one implementation of this invention, the linear generator 50 is specifically a Vernier Effect Permanent Magnet linear Generator (VPMLG). This machine, as depicted in FIG. 6, is a permanent magnet synchronous electrical machine that utilizes higher order space harmonics of the magnetic field in the air gap 61 due to multiphase stator winding currents that are contained in open slots 64 at the air gap surface of the stators 52. Standard or conventional permanent magnet synchronous machines employ only the fundamental component of the air gap magnetic field due to the slotted stator winding currents. By contrast, the present implementation has a dual stator permanent magnet linear generator, with stators 52 providing coils on both sides of a central permanent magnet translator 54. The translator 54 is formed by a stack of alternating electrical steel laminations 62 and permanent magnets 64 forming the translator modules 55 which are joined by supports 66 which are interconnected to the rod 36. The permanent magnets 64 are oriented with their poles facing the direction of travel 58 rather than facing the face of the stator modules. In the exemplary implementation the poles alternate polarity orientation. The stators 52 are maintained in two separate pluralities in opposing stator supports 68a and 68b and are offset from one another on opposing sides by one half slot pitch SP/2 as seen in FIG. 6 with the slot pitch SP for each stator 52. Stator supports 68a and 68b are supported by or rigidly connected to structure of the reaction body 16 as represented by element 38 in FIG. 3. Both sets of stators 52 on the opposing stator supports 68a, 68b utilize the common translator 54 in order to optimally engage the magnetic flux. While the translator modules 55 are shown in FIG. 5 as evenly dimensioned with the stators 52 for convenience in depiction, the translator modules 55 are cyclically offset from the stators 52 as shown in FIG. 6 in the exemplary implementation employing a VPMLG.

Figure 7:
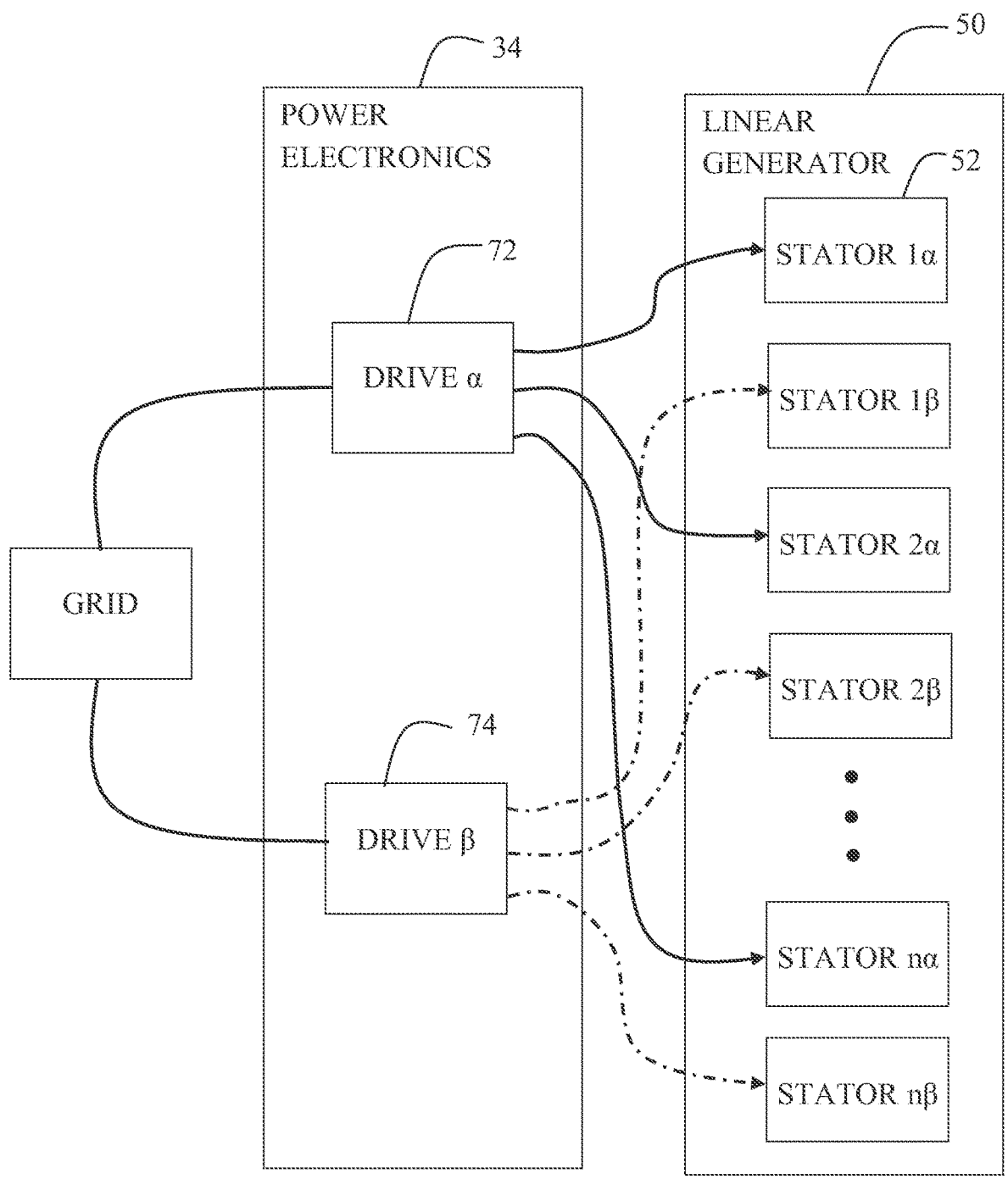
FIG. 7 is a diagram of the power electronics and stator connections.

In one implementation of this invention the linear generator 50 is driven by the low level controller 32 and power electronics 34 as a single machine. In an alternate implementation of the invention the stators employed in the linear generator are driven individually or in sub-sets to achieve improved thermal operating characteristics. An example arrangement of two power electronics drives 72 and 74 operating two sets of a number of linear generator stators (identified as α and β) is depicted in FIG. 7. In this arrangement the two subsets (1 α, 2 α . . . n α and 1 β, 2 β . . . n β) of stators 52 supported in the opposing stator supports 68a and 68b, can be controlled independently to drive a single translator 54 between the two stator supports. Drive α 72 is shown driving the α stators in parallel and drive β 74 is shown driving the βstators in parallel schematically in FIG. 7 which may be accomplished by mechanical connection or by controlled electrical connection. Alternatively, the mechanical connection or controlled electrical connection may be employed to drive the stators 52 in series. As show in FIG. 8 a plurality of linear generators 50a, 50b, 50c and 50d may be supported within a housing 82 of the reaction body 16, seen in FIG. 1. The orientation and number of linear generators may be varied to accommodate space available within the reaction body 16 and to take advantage of various cooling scenarios for the stators. The arrangement of stators supports 68a (outside) and 68b (inside) in the example shown in FIG. 8 would result in greater cooling capability for the outer stators that can conduct heat out to the water 14 through the housing 82 of the reaction body 16 compared to the inner stators that only have an internal volume 84 containing air with which to cool. The low level controller 32 can use a thermal sensor input, T, from the linear generator sensors 31 to determine how much current to apply to each of the stator sets in order to achieve to desired change in power take-off force commanded by the high level controller 30 while maintaining thermal equilibrium between the stators modules 52 on the outside and inside stator supports a and 68aand 68b. The overall result of this is an improved capability of the whole PTO system as all stators 52 are no longer limited by the stators with the poorest cooling capability.

Figure 8:
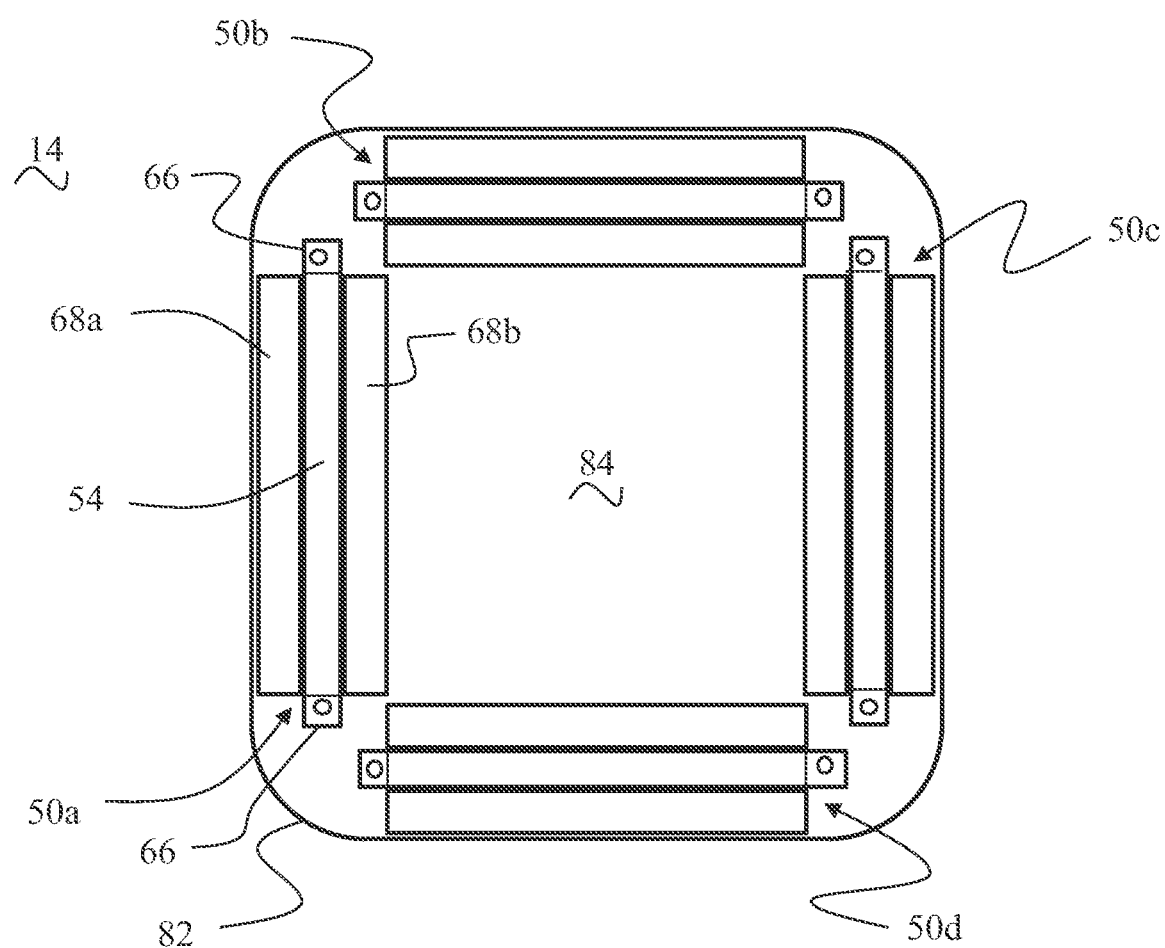
FIG. 8 is a drawing depicting an example physical arrangement of linear generators within a sealed housing from a top view.

The implementation shown in FIG. 8 while shown with the translators 54 of the linear generators 50a, 50b, 50c and 50d are configured to be mechanically connected in parallel between the floating body 12 and reaction body 16, the linear generators may be electrically connected in parallel or in series as previously described. In certain implementations, the linear generators may be aligned and mechanically interconnected in series.

While the invention has been described with reference to specific implementations, it will be understood by those skilled in the art that various changes may be made and equivalents may be substituted for elements thereof without departing from the true spirit and scope of the invention. In addition, modifications may be made without departing from the essential teachings of the invention as defined in the following claims.

What is claimed is:

1. A wave energy converter comprising:
   a floating body;
   a reaction body engaging the floating body, said reaction body static or oscillating out of phase relative to the floating body;
   a power take-off (PTO) having
      at least one direct drive Vernier linear generator using higher order space harmonics;
   a high level controller responsive to one or more sensors engaged to the direct drive Vernier linear generator and transmitting signals to the high level controller which include a present force (Fpto) applied between the direct drive Vernier linear generator and the floating body, a position (z) of a translator relative to a plurality of stators of the direct drive Vernier linear generator and a rate of change of the position (dz), the high level controller containing an estimator block, a prediction block, and a control block, said control block including a model of the wave energy converter and the direct drive Vernier linear generator including the mass and hydrodynamic properties of each body and providing a PTO force change command ($dF_{PTO}$);
   a low level controller receiving the PTO force change command and providing one or more control signals to one or more power electronics connected to the direct drive Vernier linear generator, said direct drive Vernier linear generator operable responsive to the one or more control signals to achieve optimal power extraction performance with high force at low speed with operation in two physical directions and operating as both a motor and a generator for a total of four quadrants of control.

2. The wave energy converter as defined in claim 1 wherein the at least one direct drive linear generator comprises:
   the plurality of stators linked in series having lateral edges flush with one-another creating a single electric machine; and,
   the translator having a plurality of translator modules mechanically connected at lateral edges of the translator by supports and matching the length of the linked stators plus an excess length in a direction of oscillatory travel determined to meet a desired stroke length of the direct drive linear generator.

3. The wave energy converter as defined in claim 2 wherein the translator is connected to the floating body with a rod and the stators are linked to the reaction body.

4. A wave energy converter comprising:
   a floating body;
   a reaction body engaging the floating body, said reaction body static or oscillating out of phase relative to the floating body;
   a power take-off (PTO) having
      at least one direct drive linear generator comprising
      a plurality of stators linked in series having lateral edges flush with one-another creating a single electric machine; and a translator having a plurality of translator modules, a stack of alternating electrical steel laminations and permanent magnets forming the plurality of translator modules, said plurality of translator modules mechanically connected at lateral edges of the translator by supports and matching the length of the linked stators plus an excess length in a direction of oscillatory travel determined to meet a desired stroke length of the direct drive linear generator, said PTO interconnected to a rod engaging the floating body;

a high level controller responsive to one or more sensors engaged to the direct drive linear generator and providing a PTO force change command ($dD_{PTO}$);

a low level controller receiving the PTO force change command and providing one or more control signals to one or more power electronics connected to the direct drive linear generator, said direct drive linear generator operable responsive to the one or more control signals to achieve optimal power extraction performance with high force at low speed with operation in two physical directions and operating as both a motor and a generator for a total of four quadrants of control.

5. The wave energy converter as defined in claim 4 wherein the at least one direct drive linear generator comprises a plurality of direct drive linear generators, said plurality of direct drive linear generators mechanically connected in parallel between the floating body and the reaction body.

6. The wave energy converter as defined in claim 4 wherein the plurality of translator modules of the at least one linear generator employ magnets having poles aligned with a direction of travel of the translator.

7. The wave energy converter as defined in claim 4 wherein the stators in the plurality of stators comprise a first plurality of stators mounted in a first stator support and a second plurality of stators mounted in a second opposing stator support, said first and second opposing stator supports maintaining the first and second plurality of stators offset by a one half slot pitch.

8. The wave energy converter as defined in claim 7 wherein the first plurality of stators and second plurality of stators are separately driven by the one or more power electronics.

9. The wave energy converter as defined in claim 8 wherein the first plurality of stators and second plurality of stators are driven with different currents determined to provide a thermal equilibrium.

10. The wave energy converter as defined in claim 7 wherein the stator supports are supported by or rigidly connected to a structure of the reaction body and the translator is connected to the floating body.

11. The wave energy converter as defined in claim 4 wherein the high level controller contains an estimator block, a prediction block, and a control block, said control block including a model of the WEC and the linear generator including the mass and hydrodynamic properties of each body and wherein:

the one or more sensors associated with the linear generator transmit signals to the high level controller which include a present force (Fpto) applied between the linear generator and the floating body, a position (z) of the translator relative to the plurality of stators of the linear generator and a rate of change of the position (dz).

12. A method for wave energy conversion comprising:

buoyantly supporting a floating body on a water surface;

engaging the floating body with a reaction body, said reaction body static or oscillating out of phase relative to the floating body;

engaging the floating body with a rod interconnected to at least one linear generator in a power take off (PTO), each of the at least one linear generators comprising a plurality of stators linked in series having lateral edges flush with one-another creating a single electric machine; and, a translator having a plurality of translator modules, a stack of alternating electrical steel laminations and permanent magnets forming the plurality of translator modules, said plurality of translator modules mechanically connected at lateral edges by supports and matching the length of the linked stators plus an excess length in a direction of oscillatory travel determined to meet a desired stroke length of the direct drive linear generator said supports interconnected to the rod engaging the floating body;

engaging the plurality of stators to the reaction body for translation of the translator within the stators; and extracting electrical power from the PTO.

13. The method for wave energy conversion of claim 12 wherein the at least one linear generator comprises a plurality of linear generators and further comprising electrically connecting the plurality of linear generators in series.

14. The method for wave energy conversion of claim 12 wherein the at least one linear generator comprises a plurality of linear generators and further comprising electrically connecting the plurality of linear generators in parallel.

* * * * *